(12) United States Patent
Oskouei

(10) Patent No.: US 6,428,011 B1
(45) Date of Patent: Aug. 6, 2002

(54) MECHANICAL SEALS

(75) Inventor: Easa Taheri Oskouei, Sheffield (GB)

(73) Assignee: AES Engineering Limited, Rotherham (GB)

( * ) Notice: Subject to any disclaimer, the term of this patent is extended or adjusted under 35 U.S.C. 154(b) by 0 days.

(21) Appl. No.: 09/398,529

(22) Filed: Sep. 16, 1999

(51) Int. Cl.⁷ ................................................ F16J 15/34
(52) U.S. Cl. ...................................... 277/358; 277/408
(58) Field of Search ................................ 277/358, 359, 277/360, 370, 377, 390, 399, 400, 401, 402, 403, 408

(56) References Cited

U.S. PATENT DOCUMENTS

| 3,813,103 | A | * | 5/1974 | Wiese |
| 3,843,140 | A | * | 10/1974 | Mayer et al. |
| 4,103,907 | A | * | 8/1978 | Inouye et al. |
| 4,266,786 | A | * | 5/1981 | Wiese |
| 4,545,588 | A | * | 10/1985 | Nagai |
| 4,586,717 | A | * | 5/1986 | Sweeney |
| 5,090,711 | A | * | 2/1992 | Becker |
| 5,468,002 | A | * | 11/1995 | Wasser |
| 5,498,007 | A | * | 3/1996 | Kulkarni et al. |
| 5,630,699 | A | * | 5/1997 | Kirby et al. |
| 5,913,520 | A | * | 6/1999 | Clark et al. |
| 5,938,205 | A | * | 8/1999 | Azibert et al. |
| 5,938,206 | A | * | 8/1999 | Kolsterman et al. |

* cited by examiner

Primary Examiner—Anthony Knight
Assistant Examiner—Vishal Patel
(74) Attorney, Agent, or Firm—Edwin D. Schindler

(57) ABSTRACT

A mechanical shaft seal includes stationary and rotary assemblies providing mating seating faces 3, 11 such that first and second fluids are kept separate from each other. A barrier fluid system provides a third fluid between the first and second fluids and a flow inducer 13 promotes axial flow of the barrier fluid in the desired direction irrespective of the direction of rotation of the rotary assembly.

18 Claims, 10 Drawing Sheets

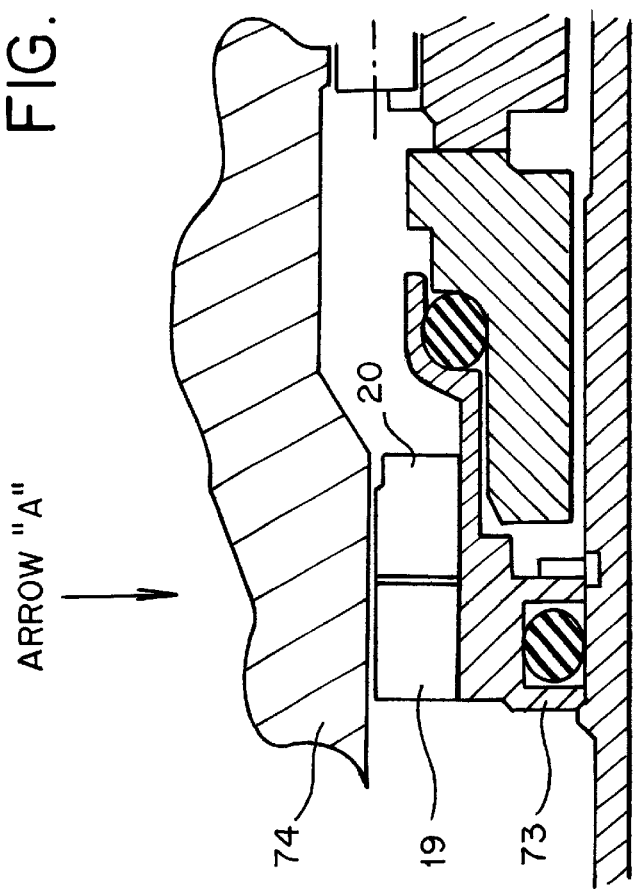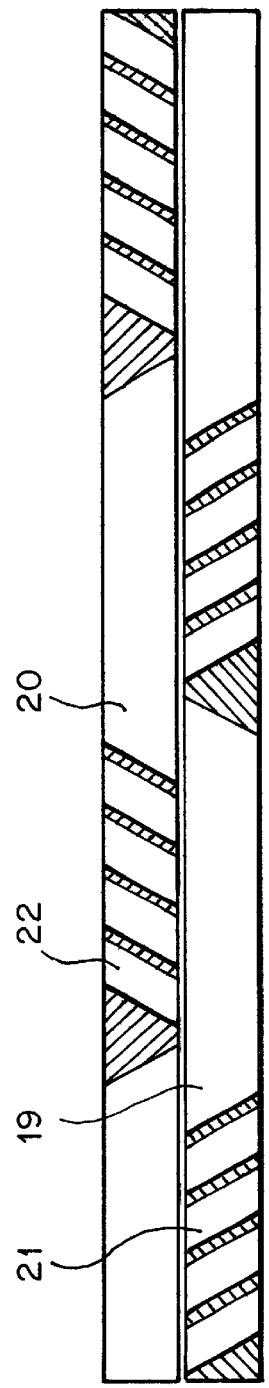

MECHANICAL SEALS

FIELD OF INVENTION

This invention relates to mechanical seals which may be used to separate a first liquid fluid from a second fluid. In the context of a pump, for example, the mechanical seal is mounted so as to extend between the pump shaft and the pump housing.

BACKGROUND OF THE INVENTION

A mechanical shaft seal for separating a first liquid fluid from a second fluid includes a rotary assembly for mounting on a rotatable shaft for rotation therewith and a stationary assembly for securing to a fixed structure within which the rotary assembly is located. Such a seal includes a "floating component" which forms part of either the rotary or the stationary assembly and which is axially moveable relative to the rotatable shaft. In addition, the seal includes a "static" component which forms part of the other of the rotary and stationary assemblies, this component being axially fixed relative to the rotatable shaft. The floating component has a flat angular end face or seal face which is directed toward the static component, usually by means of one or more springs, to close the seal faces together to form a sliding face seal.

A seal with a floating component forming part of the rotary assembly is described as a rotary seal and a seal whose floating component forms part of the stationary assembly is referred to as a stationary seal.

If the sliding seal between the rotary and stationary components is assembled and pre-set prior to despatch from the manufacturer, the seal is referred to as a "cartridge seal". If the rotary and stationary components are despatched in unassembled form from the manufacturer, the seal is a "component seal".

A mechanical seal may be single mechanical seal or a multiple mechanical seal, typically a double or triple mechanical seal. Furthermore a mechanical seal may include a barrier fluid system by means of which a third fluid, normally liquid, is fed to the seal and this third or barrier fluid acts to separate the first and second fluids and is intended to facilitate the removal of heat generated between the sliding seal faces, thereby helping to prolong the life of the seal.

In order for the barrier fluid system to be effective, the barrier fluid has to be fed to the seal and, within the seal, to one or more areas where cooling is to be effected and thence is fed away from the seal. This involves axial movement of the barrier fluid and to some extent this is affected by the forces induced as a result of the rotation of the rotary assembly relative to the stationary assembly.

STATEMENTS OF THE INVENTION

The present invention is based on the discovery that there may be located within the seal a means for promoting or enhancing the actual movement of the barrier fluid along a desired flow path, which means may be effective regardless of the direction of rotation of the rotary assembly relative to the stationary assembly.

According to the present invention there is provided a mechanical shaft seal for separating a first liquid fluid from a second fluid comprising:

(a) a rotary assembly for mounting on rotatable shaft for rotation therewith:

(b) a stationary assembly for securing to a fixed structure within which the rotary assembly is located;

(c) said rotary assembly and said stationary assembly each carrying a respective mating sealing face;

(d) one of said seal faces being located on a floating component mounted for axial movement with respect to said shaft;

(e) means for urging the floating component in a direction toward the other of said seal faces;

(f) means for feeding a third fluid to a location within the seal which, when the seal is in use, lies between the first and second fluids; and (g) means for promoting axial flow of said third liquid within the seal, said axial flow promoting means being arranged to promote said flow irrespective of the direction of rotation of the rotating assembly relative to the stationary assembly.

Preferably the axial flow promotion means comprises a member having a grooved, circumferentially extending face, at least one groove extending both axially and circumferentially in one direction about said face and at least one other groove extending both axially and circumferentially in the opposite direction about said face.

Accordingly the present invention provides the inducement of barrier fluid flow which is independent of the direction of rotation of the equipment of which the seal forms a part.

Preferably the grooves have a plan view angle relative to the longitudinal axis of the seal of between 1° and 89°.

The base of at least one of the grooves may be inclined radially relative to the longitudinal axis of the seal. Additionally or alternatively, the face of the grooved member, between at least two grooves, may be inclined relative to the longitudinal axis of the seal.

The grooves may be circumferentially adjacent each other on the grooved member. Alternatively, at least one groove may be axially adjacent or separated from at least one other groove.

The groove member may form part of the rotary assembly. The fixed structure to which, in use, the stationary assembly is secured will include a housing having a component located radially outside grooved member, said component having an inner face which is inclined relative to the longitudinal axis of the seal.

Alternatively, the grooved member may form part of the stationary assembly or, in use, form part of the fixed structure to which the stationary assembly is attached.

Preferably the seal defines a space to which, in use, the third fluid is fed, there being located within said space means for dividing said space into two opposing flow paths for said third fluid.

The present invention may be applied to rotary and stationary seals whether they are of cartridge or component type.

BRIEF DESCRIPTION OF THE DRAWINGS

The accompanying drawings are as follows:

FIG. 7 is a longitudinal section of part of a third embodiment of a seal in accordance with the present invention;

FIG. 8 is an extrapolated plan view of the grooved face of the axial flow promoting member of the seal of FIG. 7;

DETAILED DESCRIPTION OF THE INVENTION

The present invention will now be described, by way of examples only, with reference to the accompanying drawings.

Figure 1:
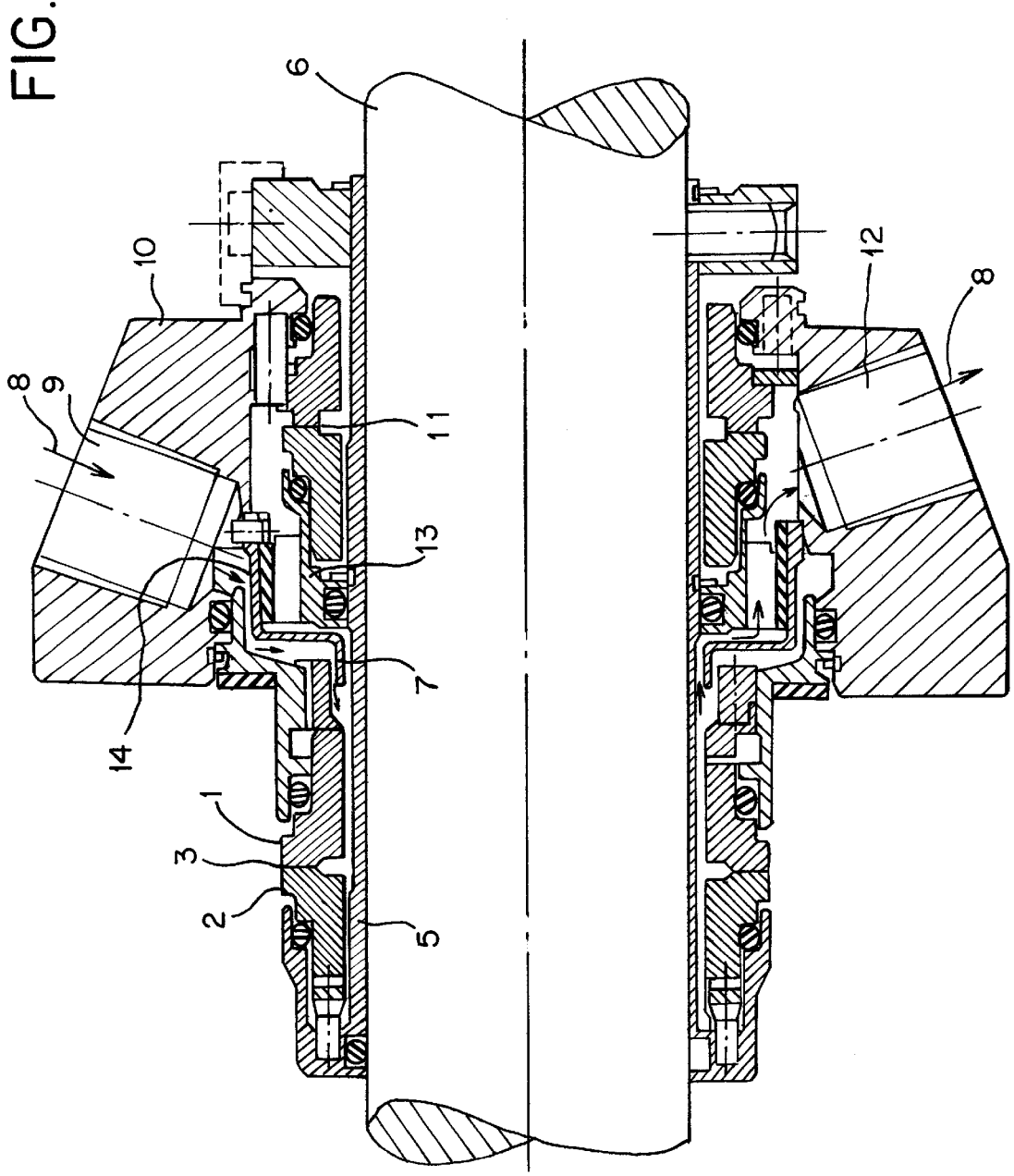
FIG. 1 is a longitudinal section through a double stationary mechanical seal in accordance with the present invention.

Referring to FIG. 1 of the accompanying drawings, there is illustrated a double stationary mechanical seal located about a rotatable shaft 6. The seal is a cartridge seal and includes on the inboard side of the seal a stationary component 1 and, a rotary component 2 which together define sealing faces 3. Rotary component 2 is located radially outwardly of a sleeve 5 which is fixed for rotation with shaft 6.

As well as the inboard sealing components mentioned above, the seal includes an outboard sealing arrangement providing sealing faces 11. Barrier fluid is fed to the seal via inlet 9 located in gland 10. The barrier fluid follows a path located radially outwardly of a deflector ring 7 in a direction towards seal face 3, this path being indicated by the arrows in the upper part of FIG. 1. The barrier fluid then follows a path located radially inwardly of deflector 7 as indicated by the arrows in the lower part of FIG. 1. The barrier fluid exits from the seal via outlet 12 located in gland 10. The barrier fluid may then be recycled back to inlet 9.

Figure 2:
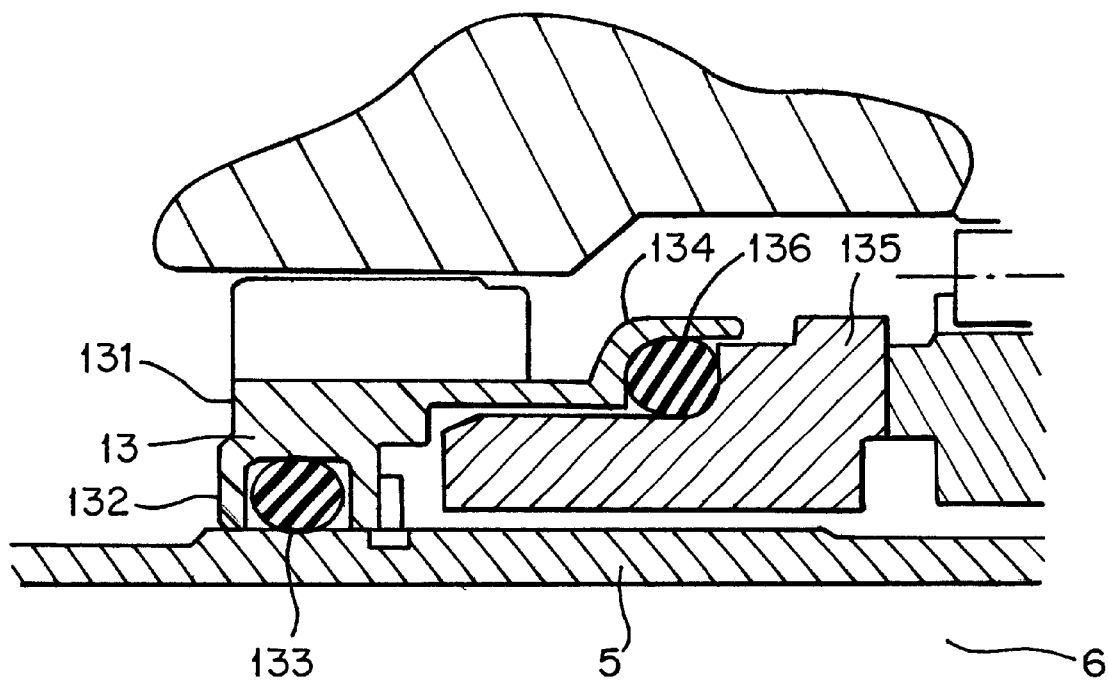
FIG. 2 is a longitudinal section of part of a seal similar to that shown in FIG. 1.
Figure 3:
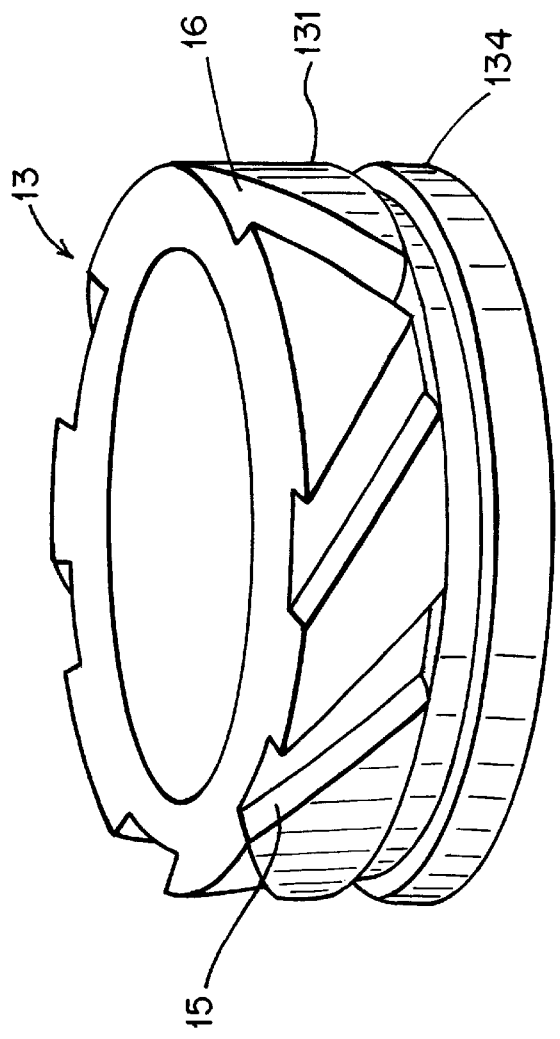
FIG. 3 is a perspective view of the axial flow promoting member of the seal shown in FIG. 2.

Flow inducing ring 13 is located between the inboard sealing faces 3 and the outboard sealing faces 11. At best seen in FIGS. 2 and 3, ring 13 includes a main body portion 131 from the inner edge of which extends an integral channel 132 housing an O ring 133. O ring 133 bears against sleeve 5.

Extending in an outboard direction from main body portion 131 of ring 13 is a flange 134 which steps outwardly to provide a space between this flange and the rotary component 135 of the outboard seal. Located in this space is a further O ring 136. Accordingly the flange inducer ring forms part of the rotary assembly with which it is in sealing engagement through rings 133 and 136.

Figure 4:
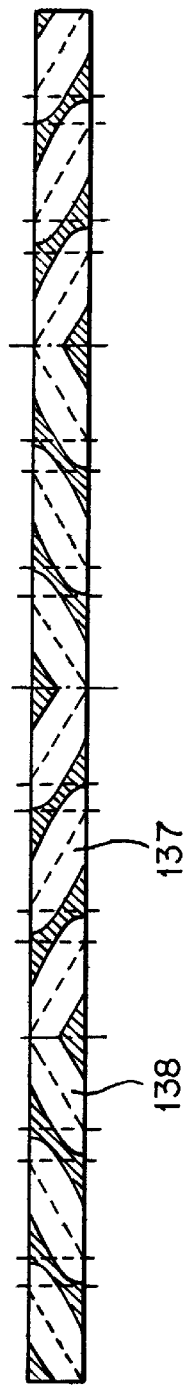
FIG. 4 is an extrapolated plan view of the grooved face of the member shown in FIG. 3.
Figure 5A:
FIGS. 5a to 5d are extrapolated plan views of alternative groove patterns.
Figure 5B:
Figure 5C:
Figure 5D:

Extending into main body portion 131 of ring 13 from the outer face thereof is a plurality of deep grooves, slots or vanes 15, each of which extend from the inboard face of main body portion 131 to the outboard face thereof. Each groove 15 is rectangular in cross section and extends not only axially but also circumferentially across the main body portion 131 of ring 13. Some of the grooves extend circumferentially in one direction and others in the opposite direction. The resulting pattern of grooves is best seen in FIG. 4 from which it will be seen that some grooves 137 are single grooves and others 138 are double grooves due to the meeting of two single grooves where they converge on the inboard or outboard edge of body portion 131. The resulting pattern is one of alternating double and single grooves, the double grooves being of chevron shape in plan.

The grooves 15 and 16, located on ring 13, rotate with the seal and cause the barrier fluid to be propelled axially in an outboard direction. When the shaft 6 is rotating in one direction, then grooves 15 are effective to cause the barrier fluid flow and when the shaft rotates in the opposite direction, grooves 16 are effective to cause barrier fluid flow in the same outboard direction. Accordingly barrier fluid flow is achieved irrespective of the direction of the rotation of flow inducing ring with the shaft.

FIGS. 5a to 5d illustrate different groove patterns that are effective to produce barrier fluid flow in the desired direction irrespective of the direction of rotation of the shaft. It will been seen that in each of these groove patterns there are some grooves which extend in one direction circumferentially and others in the opposite direction. The pattern of grooves as well as the shape of each groove may be varied to suit the performance required from the flow inducing ring.

Figure 6:
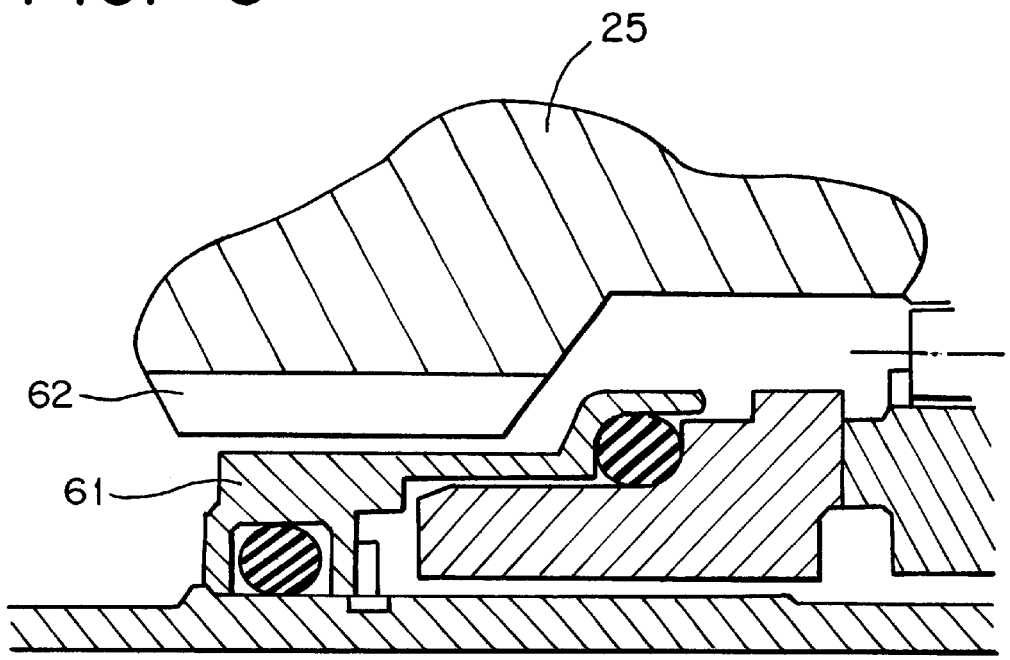
FIG. 6 is a longitudinal section of part of a second embodiment of a seal in accordance with the present invention.

Referring to FIG. 6 of the accompanying drawings, there is illustrated a second embodiment of a seal in accordance with the present invention. This seal is substantially similar to that shown in FIG. 1. However, in this case ring 61, which corresponds to ring 13 of the FIG. 1 embodiment is not provided with the grooves 15 and 16. Instead the housing 25 is provided with grooves 62 which extend radially outwardly from the inner face of the housing adjacent ring 61. The pattern of grooves is similar to that shown in FIG. 4.

The grooves 15 and 16 in the ring 13 make an angle of about 30° from the longitudinal axis. As illustrated in FIGS. 5a to 5d, the grooves may make other angles and indeed the angle may vary from 1° to 89°, typically from 5° to 85°.

Referring to FIG. 7 of the accompanying drawings, a third embodiment of a seal in accordance with the present invention is broadly similar to that illustrated in FIG. 1. The flow inducing ring 73 is provided, however, with two sets of grooves, inboard set 19 and outboard set 20, the two sets being located axially adjacent each other in a tandem arrangement. The inboard set 19 is provided with grooves 21 (see FIG. 8) which produce barrier flow when the shaft rotates in a clockwise direction. The outboard 20 has grooves 22 which produce a barrier flow when the shaft rotates in an anti-clockwise direction.

Figure 9:
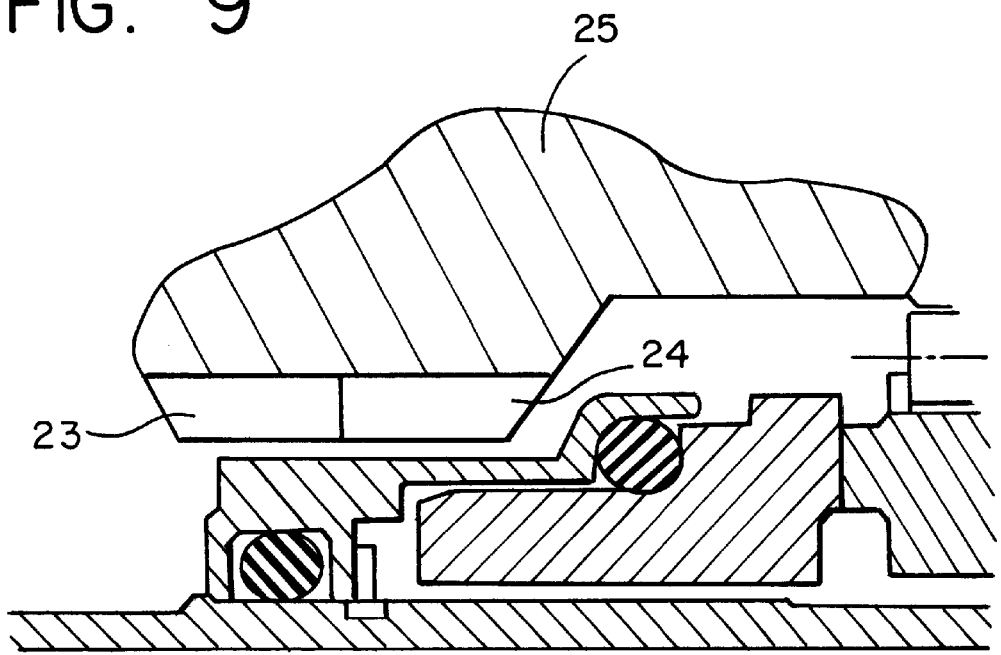
FIG. 9 is a longitudinal section through a fourth embodiment of a seal in accordance with the present invention.

It will be appreciated that the inboard and outboard sets of grooves could be interchanged. Also the number of sets of grooves, and the orientation of the grooves within each set, can be varied to produce any desired amount of barrier fluid flow. Furthermore the sets of grooves may be placed on the inner surface of the housing 74 as shown in FIG. 9 representing a fourth embodiment of the present invention.

Figure 10:
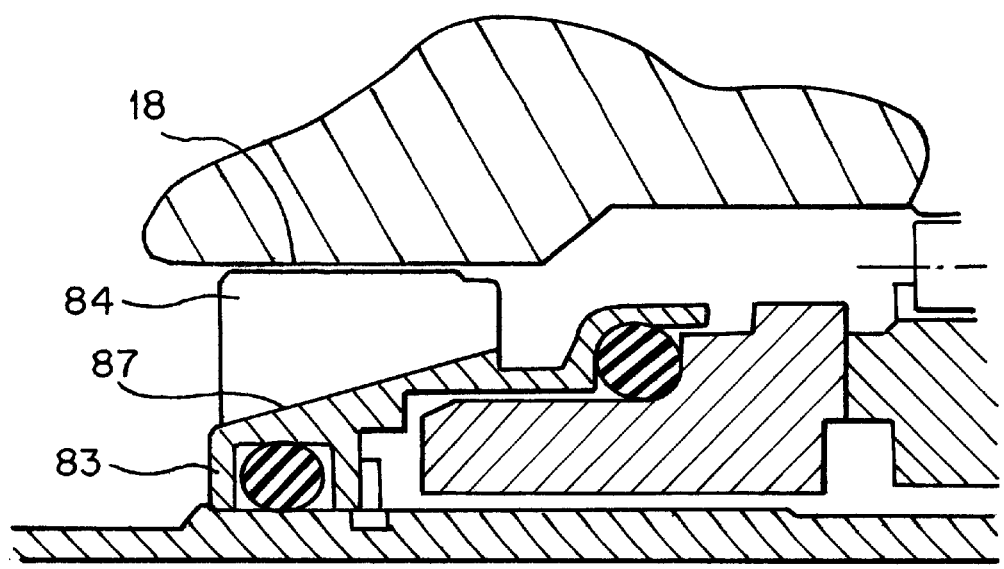
FIG. 10 is a longitudinal cross section of part of a fifth embodiment of a seal in accordance with the present invention.

Referring to FIG. 10 of the accompanying drawings, a fifth embodiment of a seal in accordance with the present invention is broadly similar to that shown in FIG. 1. However in this case the flow inducing ring 83 is provided with grooves 84, each of which has an inclined base 87, the inclination being in an outward direction from the inboard to the outboard side of the seal.

Figure 11:
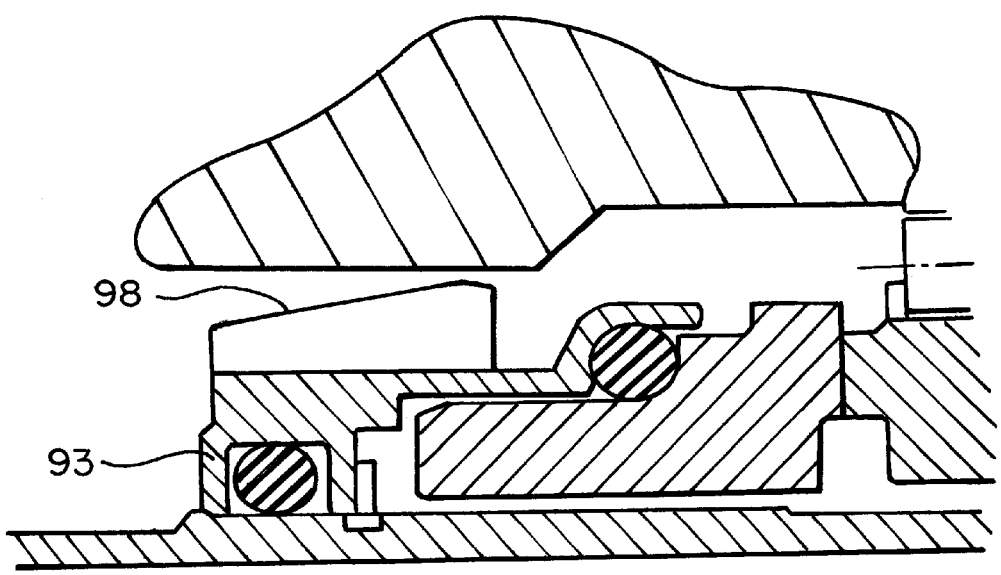
FIG. 11 is a longitudinal section through part of a seventh embodiment of a seal in accordance with the present invention.

Referring to FIG. 11 of the accompanying drawings, a sixth embodiment of a seal in accordance with the present invention is again similar to that illustrated in FIG. 1. However, in this case the flow inducing ring 93 has an inclined outside diameter 98, the inclination again being outwardly from the inboard to the outboard side of the seal.

Figure 12A:
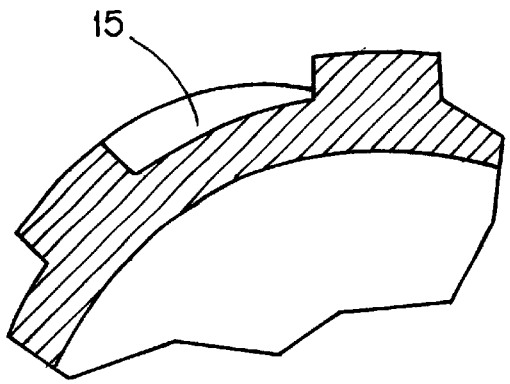
FIGS. 12a to 12c illustrate different groove profiles of flow promoting members which may be used in seals for the present invention.
Figure 12B:
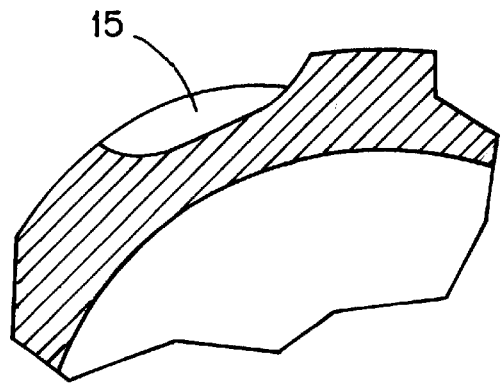
Figure 12C:
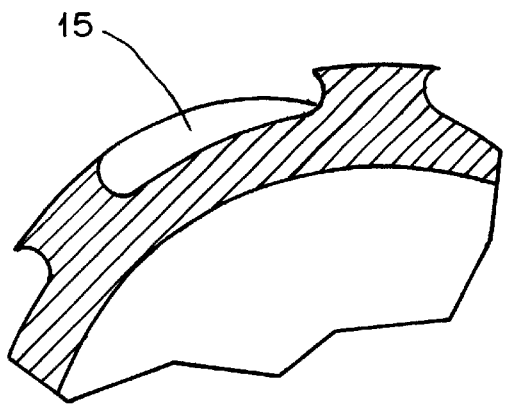

Referring to FIGS. 12 to 12c of the accompanying drawings, there are illustrated different groove cross-sections which may be used in, for instance, the flow inducing ring 13 of the FIG. 1 embodiment. In FIG. 12a, the groove 15 has a cross-section similar to that shown in FIG. 3. The groove in cross-section has a base which is curved to follow the circumferential surface of the ring at that diameter. The sides of the groove extend radially outwardly from the base.

The groove 15 shown in FIG. 12b is gently curved from the centre of its base where it follows the circumference at that diameter, the curve changing direction to provide the curved sides of the groove extending to the outer surface of the ring. In FIG. 12c the grooves 15 are also curved but much more sharply at the sides of the groove so that each side is channel-shaped.

Figure 13:
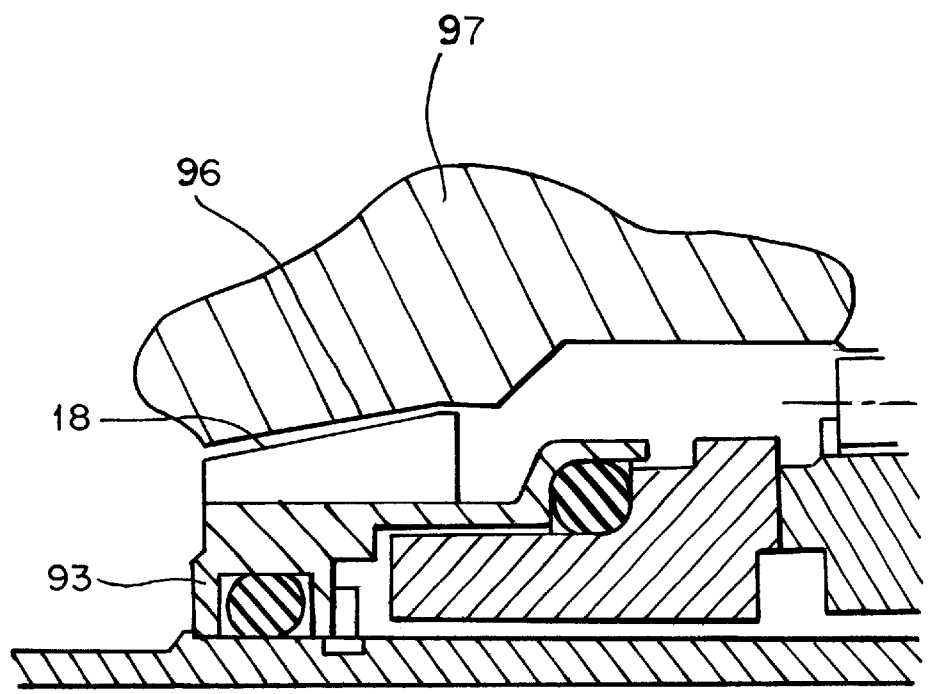
FIG. 13 is a longitudinal section of part of a seventh embodiment of a seal in accordance with the present invention.

Referring to FIG. 13 of the accompanying drawings, a seventh embodiment of a seal in accordance with the present invention is broadly similar to that shown in FIG. 1. However, in this case the inner radial surface 96 of housing 97 is inclined in a direction outwardly from the inboard to the outboard side of the seal. Furthermore, the outer radial surface of flow inducing ring 93 is also inclined in the same direction to provide a gap between housing 97 and ring 93 which is constant from the inboard to the outboard side.

Where the inner radial surface of the housing and/or the outer radial surface of the flow inducing ring is inclined, the angle of inclination may vary from 1° to 89°.

Figure 14:
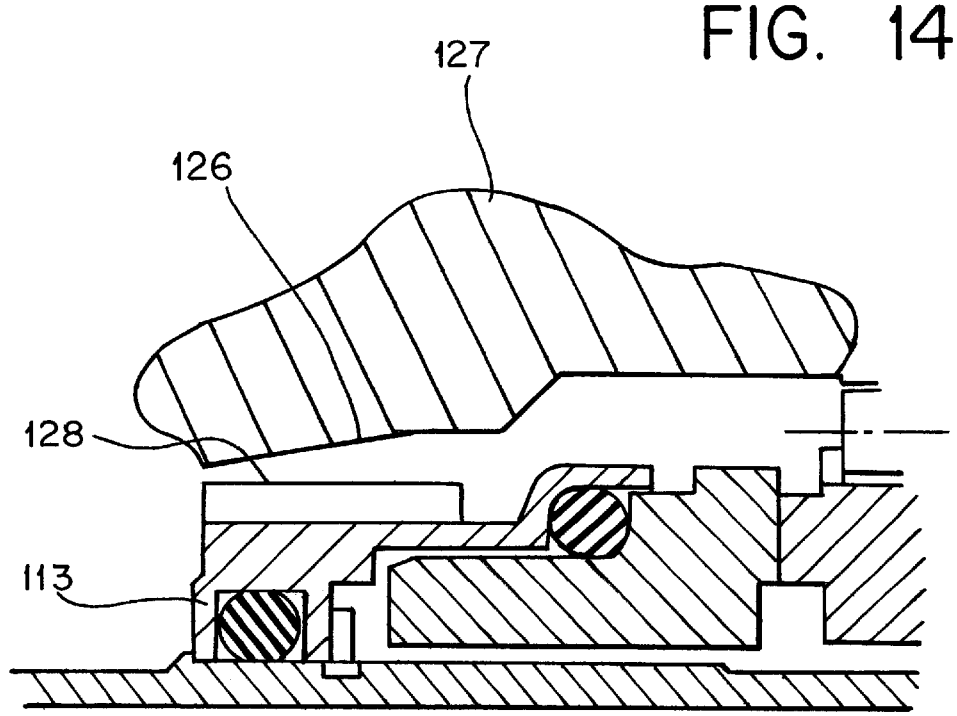
FIG. 14 is a longitudinal section of part of an eighth embodiment of a seal in accordance with the present invention.

Referring to FIG. 14 of the accompanying drawings, there is illustrated an eighth embodiment of a seal in accordance with the present invention, the seal being again broadly as shown in FIG. 1. In this case the inner radial surface 126 of housing 127 is inclined in a direction outwardly from the inboard to the outboard side of the seal. The outer radial surface 128 of flow inducing ring 113 is parallel to the longitudinal axis of the seal so that the gap between the two adjacent radial surfaces increases from the inboard to the outboard side of the seal.

It should be appreciated that the present invention may be applied to a seal to be provided between a stationary shaft and a rotatable housing.

It should also be appreciated that the flow inducing means may be located anywhere in the flowpath of the barrier fluid. For instance, in another embodiment in accordance with the present invention, the flow inducing means may be integral with the sleeve (item 5 of the FIG. 1 embodiment) and may be positioned below a deflector (item 7A of FIG. 1) which in turn extends below the inboard sealing faces.

What is claimed is:

1. A mechanical shaft seal, comprising:
   a rotatable shaft;
   a rotary assembly for mounting on said rotatable shaft;
   a stationary assembly secured to a fixed structure within said rotary assembly;
   a mating sealing face for said rotary assembly;
   a mating sealing face for said stationary assembly;
   a floating component having said mating sealing face for said rotary assembly located thereon and mounted for axial movement relative to said rotatable shaft;
   means for urging said floating component in a direction toward said mating sealing face for said stationary assembly;
   means for feeding a fluid to a location adjacent said mating sealing face for said rotary assembly and said mating sealing face for said stationary assembly;
   means for promoting an axial flow of said fluid within said mechanical shaft seal, said means for promoting said axial flow being arranged for promoting flow of said fluid irrespective of direction of rotation of said rotary assembly relative to said stationary assembly, said means for promoting said axial flow of said fluid comprising a member having a grooved, circumferentially extending face with, at least, a first groove extending both axially and circumferentially in a first direction about said extending face and with, at least, a second groove extending both axially and circumferentially in a second direction, with said first groove and said second groove each having a base inclined relative to a longitudinal axis of said mechanical shaft seal, and said second direction being in a direction opposite said first direction, thereby permitting a pumping of said fluid in two directions.

2. The mechanical shaft weal according to claim 1, wherein said first groove and said second groove each have a plan view angle of between 1° and 89°.

3. The mechanical shaft seal according to claim 1, wherein said extending face of said member, between at least two of said grooves, is inclined relative to a longitudinal axis of said mechanical shaft seal.

4. The mechanical shaft seal according to claim 1, wherein said first groove is axially adjacent said second groove.

5. The mechanical shaft seal according to claim 1, wherein said member of said means for promoting said axial flow of said fluid forms a part of said rotary assembly.

6. The mechanical shaft seal according to claim 5, wherein said fixed structure includes a housing having a component located radially outside said member of said means for promoting said axial flow of said fluid, said component having an inner face inclined relative to said longitudinal axis of said mechanical shaft seal.

7. The mechanical shaft seal according to claim 1, wherein said member of said means for promoting said axial flow of said fluid forms a part of said stationary assembly.

8. The mechanical shaft seal according to claim 1, wherein said member of said means for promoting said axial flow of said fluid forms a part of said fixed structure to which said stationary assembly is attached.

9. The mechanical shaft seal according to claim 1, wherein a space is defined within said mechanical shaft seal to which, in use, said fluid is fed, there being within said space, means for dividing said space into two opposing flow paths for said fluid.

10. A mechanical shaft seal, comprising:
    a rotatable shaft;
    a rotary assembly for mounting on said rotatable shaft;
    a stationary assembly secured to a fixed structure within said rotary assembly;
    a mating sealing face for said rotary assembly;
    a mating sealing face for said stationary assembly;
    a floating component having said mating sealing face for said stationary assembly located thereon and mounted for axial movement relative to said rotatable shaft;
    means for urging said floating component in a direction toward said mating sealing face for said rotary assembly;

means for feeding a fluid to a location adjacent said mating sealing face for said rotary assembly and said mating sealing face for said stationary assembly;

means for promoting an axial flow of said fluid within said mechanical shaft seal, said means for promoting said axial flow being arranged for promoting flow of said fluid irrespective of direction of rotation of said rotary assembly relative to said stationary assembly, said means for promoting said axial flow of said fluid comprising a member having a grooved, circumferentially extending face with, at least, a first groove extending both axially and circumferentially in a first direction about said extending face and with, at least, a second groove extending both axially and circumferentially in a second direction, with said first groove and said second groove each having a base inclined relative to a longitudinal axis of said mechanical shaft seal, and said second direction being in a direction opposite said first direction, thereby permitting a pumping of said fluid in two directions.

11. The mechanical shaft seal according to claim 10, wherein said first groove and said second groove each have a plan view angle of between 1° and 89°.

12. The mechanical shaft seal according to claim 10, wherein said extending face of said member, between at least two of said grooves, is inclined relative to a longitudinal axis of said mechanical shaft seal.

13. The mechanical shaft seal according to claim 10, wherein said first groove is axially adjacent said second groove.

14. The mechanical shaft seal according to claim 10, wherein said member of said means for promoting said axial flow of said fluid forms a part of said rotary assembly.

15. The mechanical shaft seal according to claim 14, wherein said fixed structure includes a housing having a component located radially outside said member of said means for promoting said axial flow of said fluid, said component having an inner face inclined relative to said longitudinal axis of said mechanical shaft seal.

16. The mechanical shaft seal according to claim 10, wherein said member of said means for promoting said axial flow of said fluid forms a part of said stationary assembly.

17. The mechanical shaft seal according to claim 10, wherein said member of said means for promoting said axial flow of said fluid forms a part of said fixed structure to which said stationary assembly is attached.

18. The mechanical shaft seal according to claim 10, wherein a space is defined within said mechanical shaft seal to which, in use, said fluid is fed, there being within said space, means for dividing said space into two opposing flow paths for said fluid.

* * * * *